US006260725B1

(12) United States Patent
Gonzales et al.

(10) Patent No.: US 6,260,725 B1
(45) Date of Patent: *Jul. 17, 2001

(54) COMPACT, ACCESSIBLE ENCLOSURE FOR DEVICES INSTALLED ALONG CHEMICAL GAS/LIQUID DISTRIBUTION LINES

(75) Inventors: Mark G. Gonzales, Elgin; James V. Caroselli, Austin, both of TX (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/301,292

(22) Filed: Apr. 28, 1999

(51) Int. Cl.[7] ........................................................ B65D 6/40
(52) U.S. Cl. .................................................... 220/4.21
(58) Field of Search ................................. 220/4.21, 4.26, 220/676, 484, 4.12, 4.13; 137/382, 377

(56) References Cited

U.S. PATENT DOCUMENTS

| | | | |
|---|---|---|---|
| 1,582,191 | * | 4/1926 | Snooke . |
| 1,793,038 | * | 2/1931 | Zimmermann . |
| 3,033,913 | * | 5/1962 | Dietze ................................ 220/4.21 |
| 3,519,162 | * | 7/1970 | Peterson et al. ..................... 220/4.21 |
| 3,674,169 | * | 7/1972 | Miller .................................. 220/4.21 |
| 4,520,949 | * | 6/1985 | Seitz et al. ............................ 222/108 |
| 4,925,045 | * | 5/1990 | Logsdon .............................. 220/4.24 |
| 4,960,149 | * | 10/1990 | Rizzitiello ............................. 137/205 |
| 5,374,248 | * | 12/1994 | Lopez .................................... 604/82 |
| 5,522,420 | * | 6/1996 | Martin .................................. 137/343 |
| 5,957,156 | * | 9/1999 | Hartley ................................. 137/377 |
| 5,988,208 | * | 11/1999 | Tudhope et al. ..................... 137/382 |

* cited by examiner

*Primary Examiner*—Stephen Castellano
(74) *Attorney, Agent, or Firm*—Kevin L. Daffer; Conley, Rose & Tayon P.C.

(57) ABSTRACT

An enclosure for containment of chemical distribution lines and methods for installation and modification of devices installed along such chemical distribution lines are provided. The enclosure contains two or more separable portions. Openings within the enclosure through which the chemical distribution lines or conduits extend are formed along a boundary between two separable portions. Devices, such as valves, regulators, gauges and filters may be installed along a conduit before the enclosure is formed around the portion of the conduit containing the installed devices. The enclosure may therefore be made smaller, because excess working room within the enclosure is not needed. Installed devices may be modified by removing portions of the enclosure to expose the relevant devices. The conduit portion containing the devices may be removed for device modification, before re-assembly of the enclosure around the conduit portion.

24 Claims, 9 Drawing Sheets

COMPACT, ACCESSIBLE ENCLOSURE FOR DEVICES INSTALLED ALONG CHEMICAL GAS/LIQUID DISTRIBUTION LINES

BACKGROUND OF THE INVENTION

1. Field of the Invention

This invention relates to integrated circuit fabrication, and more particularly, to an enclosure for valves, fittings and other devices which may be associated with chemical gas/liquid distribution lines found generally in a piping industry such as, for example, semiconductor fabrication.

2. Description of the Relevant Art

Integrated circuit fabrication is a complex process involving many steps. To form a metal-oxide-semiconductor (MOS) integrated circuit, for example, a gate dielectric, typically formed from silicon dioxide ("oxide"), is formed on a semiconductor substrate which is doped with either n-type or p-type impurities. For each MOS field effect transistor (MOSFET) being formed, a gate conductor is formed over the gate dielectric, and dopant impurities are introduced into the substrate to form a source and drain. Such transistors are connected to each other and to terminals of the completed integrated circuit using conductive interconnect lines.

Process steps such as those described above often require the use of liquid or gaseous chemicals. For example, the gate conductor formation described above typically involves deposition of a polycrystalline silicon ("polysilicon") layer using silane gas. The gate conductor may be etched from this polysilicon layer using a dry etch process involving chlorine and/or fluorine-containing gases. The chemicals needed are typically distributed using pipes or tubing between the corresponding sources (such as bulk gas, gas cylinders or liquid chemical tanks) to the tools (such as deposition or etching reactors) which use the chemicals.

This distribution of chemicals is subject to various constraints. For example, purity of the chemicals should be maintained so that contamination of the fabricated circuits is avoided. Another important constraint is that the chemicals be distributed according to proper safety procedures. Some of the chemicals used in semiconductor fabrication may be toxic, corrosive, and/or pyrophoric (prone to combustion when in contact with air). Such chemicals may therefore be subject to specific distribution requirements. For example, double containment is typically used for toxic, corrosive, or pyrophoric chemicals. Double containment refers to the use of an inner container or conduit containing the chemical to be distributed, surrounded by an outer container or conduit which is connected to an exhaust system. In this way, any gaseous chemical which is leaked from the inner container or conduit is drawn into the exhaust system rather than escaping into the ambient of the fabrication facility. The exhaust system may include a scrubber or other means of reducing any hazards associated with the exhaust gas. For double containment of liquid chemicals, the outer container or conduit typically includes a drain in addition to an exhaust connection, so that any liquid which is leaked from the inner container or conduit moves into the drain system of the fabrication facility.

The double containment described above may be implemented in various ways. For example, a chemical source such as a gas cylinder is typically enclosed in a cabinet which is connected to an exhaust system. The chemical may be delivered from the cabinet to the tool using a double-walled conduit, such as a tube or pipe, having a space between the inner and outer walls. The chemical is transported within the inner wall of the tube, while the space within the outer wall is connected to an exhaust system (and a drain, in the case of a liquid chemical). Measurement and/or control devices are generally installed somewhere along the path between the chemical source and the tool. Examples of such devices include valves, pressure gauges, pressure regulators, and filters. Because these measurement or control devices control or sample the chemical being transported through the conduit, the outer wall of the conduit is removed at the installation point, and the device is installed between portions of the inner wall. Installation of a measurement or control device therefore disrupts the double containment of the double-walled conduit. Such devices, and the portions of the conduit in which they are installed, must therefore be surrounded by an enclosure if double containment of the system is to be maintained.

Figure 1:
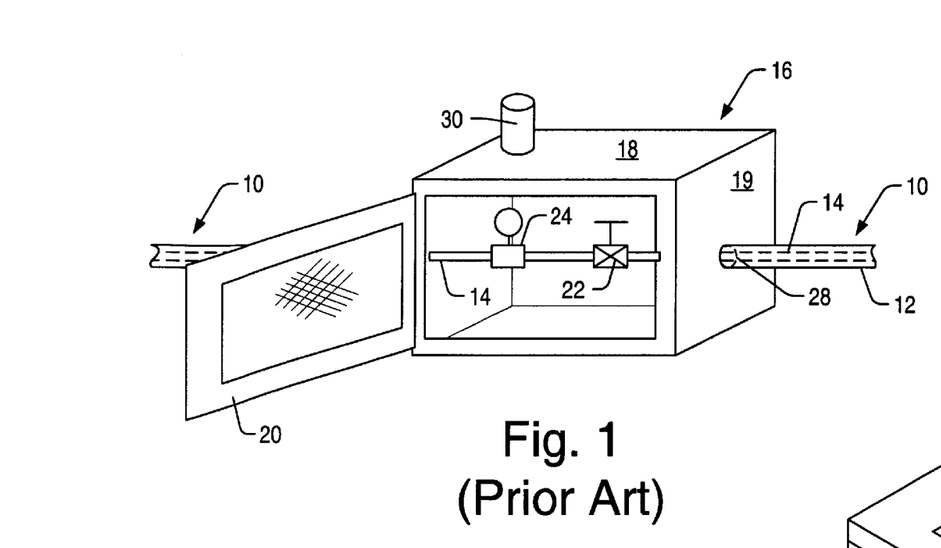
FIG. 1 is a perspective view of an enclosure used to provide containment for devices installed along an inner conduit of a double-walled conduit.

An example of an enclosure which may be used to provide double containment in the vicinity of measurement and/or control devices installed along a gas conduit is shown in FIG. 1. Conduit 10, including outer conduit 12 and inner conduit 14, is connected to either side of enclosure 16 (the connector used is not shown in FIG. 1). In the embodiment of FIG. 1, enclosure 16 includes box 18 and door 20. Outer conduit 12 is connected to box 18 at wall 19. Inner conduit 14 extends through a hole such as hole 28 in wall 19 into box 18, where its path is interrupted by one or more installed devices such as valve 22 and pressure gauge 24. External to enclosure 16, inner conduit 14 is surrounded by outer conduit 12. Enclosure 16 surrounds devices 22 and 24 and a portion of inner conduit 14 unsheathed from outer conduit 12. The volume between conduits 12 and 14 and the volume within enclosure 16 combine to form a containment volume which surrounds inner conduit 14 and through which the ambient gas (typically air) flows to an exhaust system through one or more exhaust connections 30. Door 20 of enclosure 16 provides access to devices 22 and 24.

There are some problems associated with the use of enclosures such as enclosure 16 of FIG. 1, however. For example, inner conduit 14 of FIG. 1 must be threaded through holes 28 in either side of box 18 before devices 22 and 24 can be installed. Installation of and access to devices such as 22 and 24 must therefore be accomplished with the devices inside the enclosure. Such measurement and control devices must be accessed for many reasons, including routine maintenance (such as changing filter cartridges), repair of faulty devices, and reconfiguration or upgrading of the chemical distribution system (e.g., for installation of new or replacement tools). The requirement that such maintenance, repair, or reconfiguration must be performed with the devices inside of the enclosure can cause problems in the fabrication facility. The designer of the distribution system is often forced to choose between undesirable options, such as making the enclosure oversized to allow adequate working room within it, or having to discard and replace some sections of conduit in the event that repair or reconfiguration is required, because there is insufficient room to properly disassemble or repair components within the enclosure. Making the enclosure oversized is undesirable because this takes up extra space within the fabrication facility. Fabrication facility space is limited and costly, and space used up for chemical distribution is space made unavailable for other functions, such as placement of processing tools. If the enclosure is made more compact to save space, however, multiple devices and/or multiple conduits may be spaced so closely together that a particular device cannot be accessed. In this case, an entire conduit, and possibly adjacent conduits, may have to be cut, removed and replaced in order to perform a repair on one device. In addition to the associated direct costs, such conduit replacement may result in otherwise unnecessary tool downtime.

It would therefore be desirable to develop a means of providing containment of measurement and control devices installed in a chemical distribution system, while allowing improved access to the installed devices.

SUMMARY OF THE INVENTION

The problems outlined above are in large part addressed by a compound enclosure formed from two or more separable enclosure portions. Openings, or holes, through which conduit enters and leaves the enclosure are formed along a boundary between two of the enclosure portions, such that a portion of each hole is in one of the two enclosure portions, while the remainder of each hole is in the other of the two enclosure portions. In this way, the enclosure may be assembled around one or more conduits, rather than the conduits having to be threaded into the enclosure. Measurement and control devices can therefore be installed along a conduit without the constraint of working within an enclosure. The compound enclosure is formed such that the enclosure portions are separable, preferably using latches. A portion of the enclosure can therefore be removed after installation, so that a conduit may be removed from the box for maintenance, reconfiguration, or repair. The freedom from working within the enclosure allows the enclosure to be made smaller, thereby saving space in the fabrication facility.

An exhaust connection is formed in a wall of the enclosure, so that any gases which are leaked into the enclosure may be pulled into an exhaust system. If the enclosure is to be used with a liquid chemical distribution conduit, a drain is formed in the bottom of the enclosure, so that any liquids leaked into the enclosure may flow into a drain system. The enclosure is typically used with a double-walled conduit having an inner conduit and an outer conduit. One portion of the enclosure preferably includes a mating surface with a protruding ledge around the periphery of the boundary between the portion and its adjacent enclosure portion, to aid in fitting the portions together when the enclosure is assembled. Such a mating surface and ledge is preferably discontinuous around the periphery of the boundary, however, being absent in the vicinity of the conduit holes. In this way, the assembled enclosure has a substantially uniform thickness in the vicinity of the conduit holes, and a connector such as a bulkhead connector may be used to attach the outer conduit to the enclosure. The inner conduit extends through the connector and the hole in the enclosure, while the outer conduit surrounds the portions of the inner conduit external to the enclosure. A door, which typically includes a window, is formed in a portion of the enclosure for inspection of and/or access to the devices and conduits within the enclosure.

In some embodiments, the enclosure may be formed from more than two portions. Openings for conduits may be formed along each boundary between enclosure portions, such that multiple conduit "layers" may be installed within an enclosure. Because portions of the enclosure, and the associated conduits, may be readily removed for maintenance, repair, or reconfiguration, even conduits which are behind or beneath other conduits may be readily accessible.

In addition to the enclosure described above, a method for providing containment of a device installed along a conduit is contemplated herein. A device, such as a regulator, valve, gauge, or filter, is installed along a conduit. The conduit is positioned within notches formed in each end of a first portion of a containment enclosure, such that the device is positioned between the notches. A second portion of the containment enclosure is then attached to the first portion, such that notches formed in each end of the second portion align with the notches in the first portion to form openings around the conduit. The conduit typically has a circular cross-section, and the notches are therefore preferably semicircular, such that circular openings are formed. Furthermore, the conduit typically includes an inner conduit and an outer conduit. In this case, the device is installed along a section of inner conduit not surrounded by outer conduit. An end of the outer conduit is connected to each conduit opening of the enclosure, such that the outer conduit surrounds portions of the inner conduit external to the enclosure.

A method for modifying a device installed along a conduit according to the method described above is also contemplated herein. The modification may be routine maintenance, such as changing a filter cartridge, or repair of a defective device. In addition, the modification may involve reconfiguration of the devices installed along the conduit. Such reconfiguration may be associated with installation of a new or replacement tool, for example. The second portion of the containment enclosure is removed, so that the conduit containing the device is exposed. If there is sufficient working room, the modification may be performed with the conduit in place. Alternatively, the conduit may be removed from the remaining first portion of the containment enclosure for modification of the device. After the modification is performed, the conduit is replaced within the notches of the first portion of the containment enclosure, and the second portion of the enclosure is then replaced.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed. On the contrary, the intention is to cover all modifications, equivalents, and alternatives falling within the spirit and scope of the present invention.

DETAILED DESCRIPTION OF THE PREFERRED EMBODIMENTS

Figure 2A:
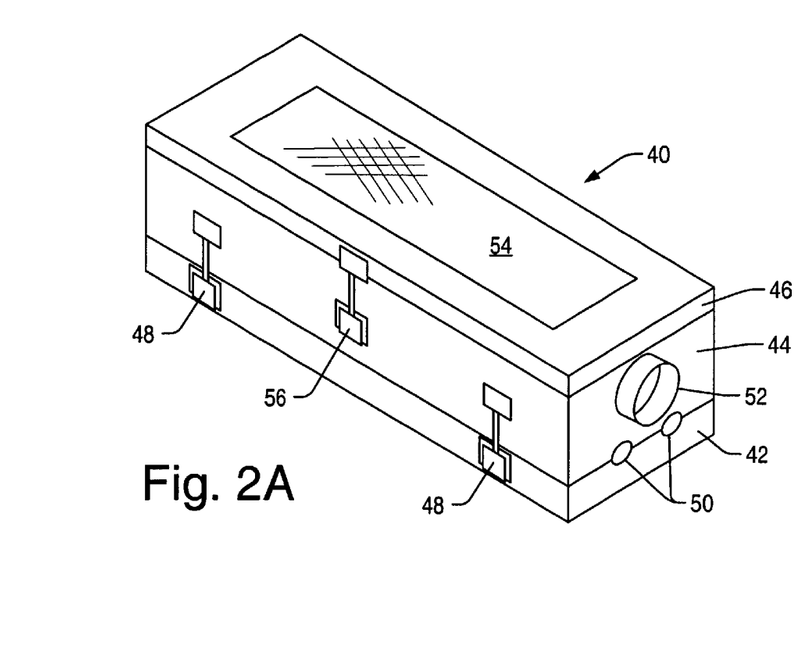
FIGS. 2a–2d are perspective and elevation views from various angles of a two-portion enclosure as recited herein for use with gas distribution lines.

Turning to the drawings, FIG. 2a is a perspective view of an embodiment of the enclosure as recited herein for containment of gas distribution lines. The enclosures shown in FIGS. 1–6 have the shape of a rectangular box. This is believed to be a convenient, readily-available shape in terms of ease of fabrication and ease of placement in the chemical distribution system. However, other shapes, such as cylindrical shapes, for example, may also be used. As in the case of all of the enclosures recited herein, enclosure 40 of FIG. 2 is made from a chemical-resistant material, or from a material coated with a chemical-resistant material. Stainless steel is believed to be a suitable material; the 316 alloy is often used for chemical distribution. Other suitable materials may include various chemical-resistant plastics.

Enclosure 40 is a two-portion enclosure, including a first portion 42 and a second portion 44. Second portion 44 includes door 46. Latches 48 are used to connect portions 42 and 44. Other fasteners having a reversible action may also be suitable, so that the enclosure may be repeatedly assembled and disassembled along the boundary between portions 42 and 44. Conduit openings 50 are formed along the boundary between portions 42 and 44 on each of the small ends of the enclosure of FIG. 2, such that two conduits may be installed running lengthwise through the enclosure. Exhaust connection 52 is formed in a wall of second portion 14, but may be formed in a different wall or a different portion of the enclosure, depending on the design and planned mounting of the enclosure. Exhaust connection 52 is typically a short tube connected to the edge of a hole in a wall of the enclosure, such that gases within enclosure 40 may be pulled through exhaust connection 52 and into an exhaust system connected to exhaust connection 52. Such an exhaust system typically uses fans to pull air and other gases through the system, and may include a scrubber or other means of mitigating or removing toxic or hazardous components of the exhaust gas. The exhaust system may also include sensors associated with a gas monitoring system. Depending on the design of the chemical distribution and exhaust systems, such sensors may also be positioned on or within exhaust connection 52 and/or enclosure 40.

Door 46 includes a window 54, which allows inspection of the conduit and devices within enclosure 40 without opening door 46. Although the use of such a window is currently preferred, the window may be omitted in some embodiments, and the door opened for viewing the inside of enclosure 40. Window 54 is formed from a transparent, shatter-resistant, and chemical-resistant material. For example, glass reinforced with a wire grid may be a suitable window material. Chemical-resistant transparent plastics may also be suitable for window 54. Latch 56 is used to open and close door 46 in the embodiment of FIG. 2. Other fasteners which allow the door to be opened and closed repeatedly may also be used. Enclosure 40 may be mounted in any orientation which allows access to latches 48 and 56, opening of door 46, and removal of portion 44 for installation and/or modification of conduits.

Figure 2B:
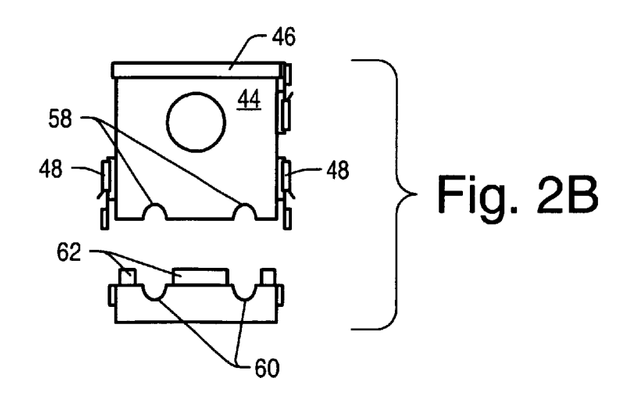
Figure 2C:
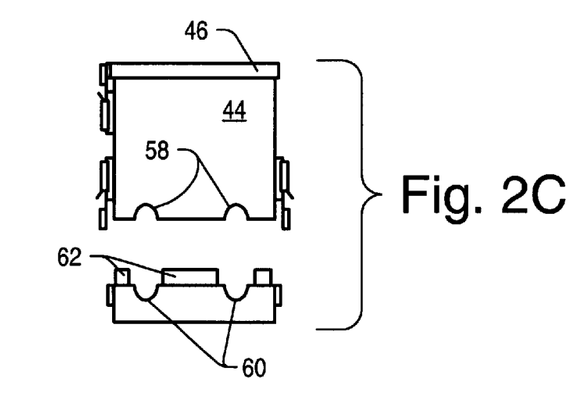
Figure 2D:
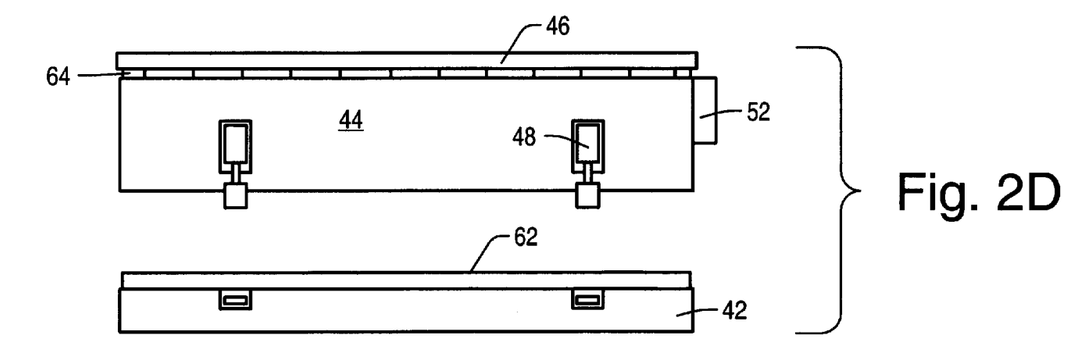

FIGS. 2b, 2c and 2d are elevation views of the right, left, and back sides, respectively, of the enclosure of FIG. 2a, with portions 42 and 44 separated. Notches 58 of portion 44 and notches 60 of portion 42, as shown in FIGS. 2b and 2c, combine to form openings 50 of FIG. 2a when portions 42 and 44 are fit together. Ledges 62 extending from portion 42 are also shown in FIGS. 2b, 2c and 2d. Ledges 62 are slightly displaced from the wall of portion 42, toward the interior of enclosure 40. A mating surface, shown in FIG. 3b below, connects each of ledges 62 to the edge of portion 42 which mates to the corresponding edge of portion 44. Ledges 62 help maintain the positioning of portions 42 and 44 with respect to each other when the portions are connected together, and could alternatively be formed along the mating edge of portion 44 rather than that of portion 42. Rather than connecting to form a ledge extending completely around the mating edge of portion 42, ledges 62 are preferably absent in the vicinity of notches 60, as shown in FIGS. 2b and 2c. In this way, the wall of enclosure 40 surrounding openings 50 has a uniform thickness. This uniform wall thickness facilitates the use of bulkhead connectors to attach conduit to the enclosure. Such bulkhead connectors are discussed in more detail in the description of FIG. 5 below. The view of FIG. 2d includes hinge 64 with which door 46 is attached to portion 44.

Figure 3A:
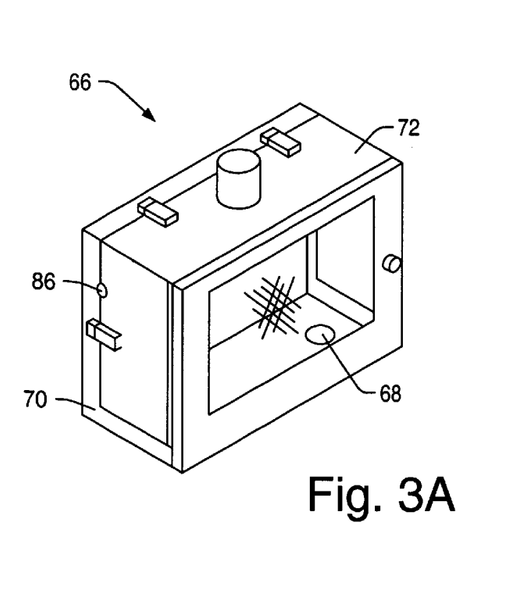
FIG. 3a is a perspective view of a two-portion enclosure as recited herein for use with liquid or gas distribution lines.

An embodiment of the enclosure for containment of liquid or gas distribution lines is shown in FIG. 3a. Differences between enclosure 66 of FIG. 3a and enclosure 40 of FIG. 2a include drain 68, formed in the bottom of enclosure 66, and the configuration of first portion 70 such that a liquid containment 76 is formed at the bottom of enclosure 66. The components of enclosure 66 are shown more clearly in the exploded view of FIG. 3b. Drain 68 is formed in the bottom wall of first portion 70, and side walls of portion 70 are connected to and extend upward from the bottom wall such that a liquid containment 76 is formed at the bottom of portion 70. In this way, any liquids which may leak into enclosure 66 can flow out of the enclosure through drain 68. Although the configurations of first portion 70 and second portion 72 are believed to be convenient for providing proper drain orientation when enclosure 66 is mounted upon a wall, other geometries may also be used, subject to the constraint of having a liquid containment and a drain at the bottom of the enclosure. Drain 68 includes a hole in the bottom of the enclosure, and may also include a pipe connected to the edge of the hole. Drain 68 allows connection of enclosure 66 to a drain system which includes piping and may include a scrubber or other means of mitigating or removing toxic or hazardous liquids from the waste fluid stream. Sensors which detect the presence of liquid and/or the presence of particular chemicals may be used as part of a monitoring system, and may be included in the drain system. Such sensors may also be used upon or within drain 68 and/or enclosure 66.

Figure 3B:
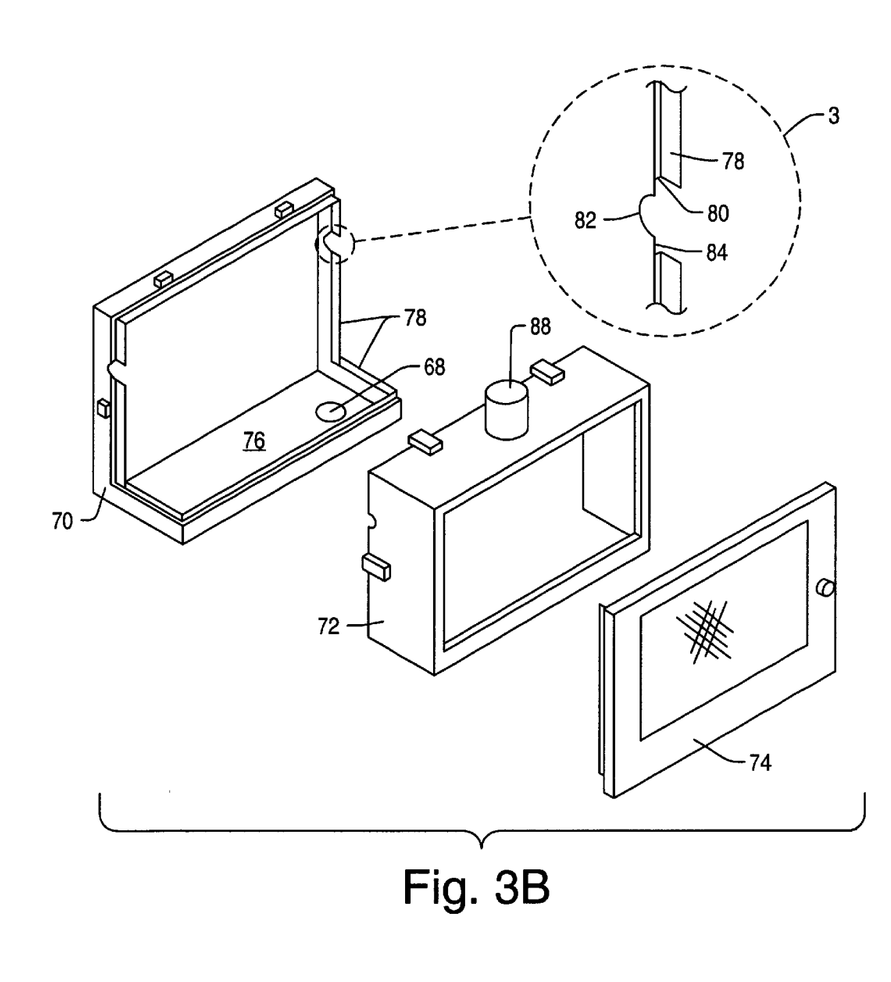
FIG. 3b is a view of the enclosure of FIG. 3a when disassembled.

Ledges 78 of FIG. 3b are similar to ledges 66 of FIGS. 2b and 2c. Breakout 3 of FIG. 3b shows ledges 78 in greater detail. In the embodiment of FIG. 3b, each of ledges 78 is substantially parallel to the wall of portion 70 to which it is attached. As shown in breakout 3, edge 78 is offset from mating edge 84 of portion 70 by mating surface 80. Ledges 78 and mating surfaces 80 help to maintain the positioning of portions 70 and 72 with respect to each other when the enclosure is assembled. As shown in breakout 3, ledges 78 are preferably absent in the immediate vicinity of notches 82. In this way, a substantially uniform wall thickness in the vicinity of conduit openings 86 may be achieved when the enclosure is assembled. As noted above in the description of FIG. 2, this uniform wall thickness may facilitate the attachment of conduit to the enclosure using a bulkhead connector. Alternate ledge configurations or other means of maintaining position of portions 70 and 72 with respect to each other may also be used. For example, ledges such as ledges 78 may be formed on portion 72 instead of on portion 70. Notches 82 are semicircular in shape in the embodiment of FIG. 3, so that openings 86 are circular. This geometry is preferred for use with conduit having circular cross-section. In the event that conduit having a different cross-sectional shape is used, the shape of notches 82 should be chosen accordingly. For all embodiments of the enclosure recited herein, the enclosure dimensions and number of notches are chosen to contain a desired number of conduits over a desired length, depending on the details of the chemical distribution application.

In the embodiment of FIG. 3, second portion 72 includes exhaust connection 88. Exhaust connection 88 is similar to exhaust connection 52 of FIG. 2, and may alternatively be formed in other positions on the enclosure, subject to mounting and drainage constraints. Portion 72 includes door 74, which is similar to door 46 in FIG. 2. In some embodiments, a gasket may be included to form a tighter seal between the door and the enclosure, or between enclosure portions. The tightness of the seal desired depends in part on the design of the exhaust system. It is typically not desired, for example, to have a vacuum created within an enclosure such as enclosures 40 and 66. Such a vacuum may be created by the exhaust system, however, if connections within the enclosure are too tightly sealed. It may be preferable, therefore, to reduce gasket use so that ambient air may be pulled in through seams of the enclosure and the desired flow rate into the exhaust system realized.

Figure 4:
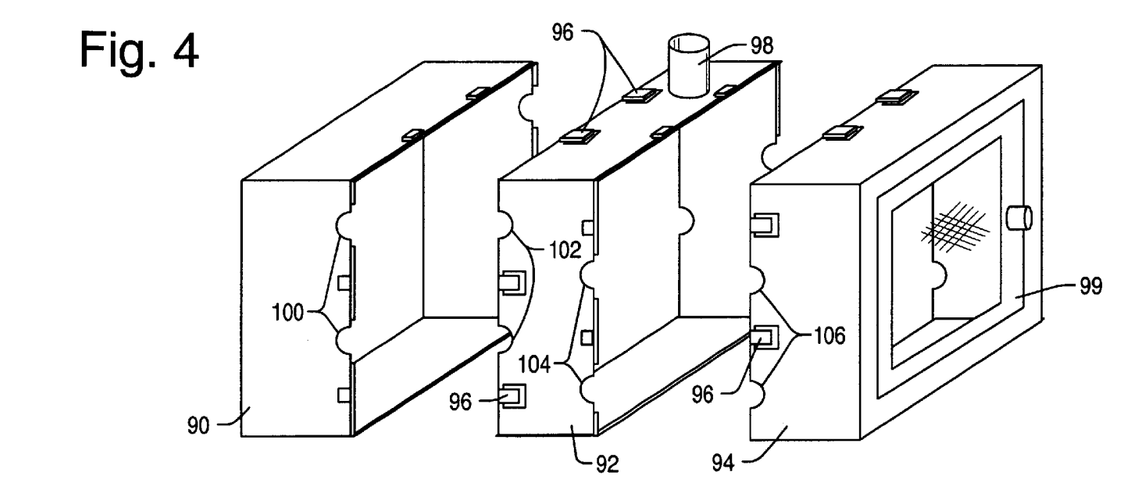
FIG. 4 is a perspective view showing portions of a three-portion enclosure for use with gas distribution lines.

Turning now to FIG. 4, an alternative embodiment of an enclosure for containment of gas distribution lines is shown. Enclosure portions 90, 92, and 94 may be connected together using fasteners such as latches 96 to form a three-portion enclosure. When the portions are connected together, notches 100 of portion 90 align with notches 102 of portion 92 to form a layer of conduit openings at the boundary between portions 90 and 92. Similarly, notches 104 of portion 92 and notches 106 of portion 94 align to form a second layer of conduit openings. Because the conduit portions can be added and/or removed one by one to allow installation or modification of a layer of conduit, multiple layers of conduit may be contained while maintaining accessibility. In other respects, including, for example, exhaust connection 98 and door 99, design considerations for the enclosure of FIG. 4 are similar to those for gas conduit enclosure 40 of FIG. 2. The concept of the enclosure of FIG. 4 may also be extended to. multiple-portion enclosures having more than 3 portions, and more than 2 layers of conduit. A multiple-portion enclosure for containment of liquid lines may also be formed, by configuring the portions such that a liquid containment and drain are included at the bottom of the enclosure. For example, a configuration similar to that of FIG. 3 could be used, wherein the bottom part of portion 70 is extended, and multiple portions connected together in place of portion 72.

Figure 5A:
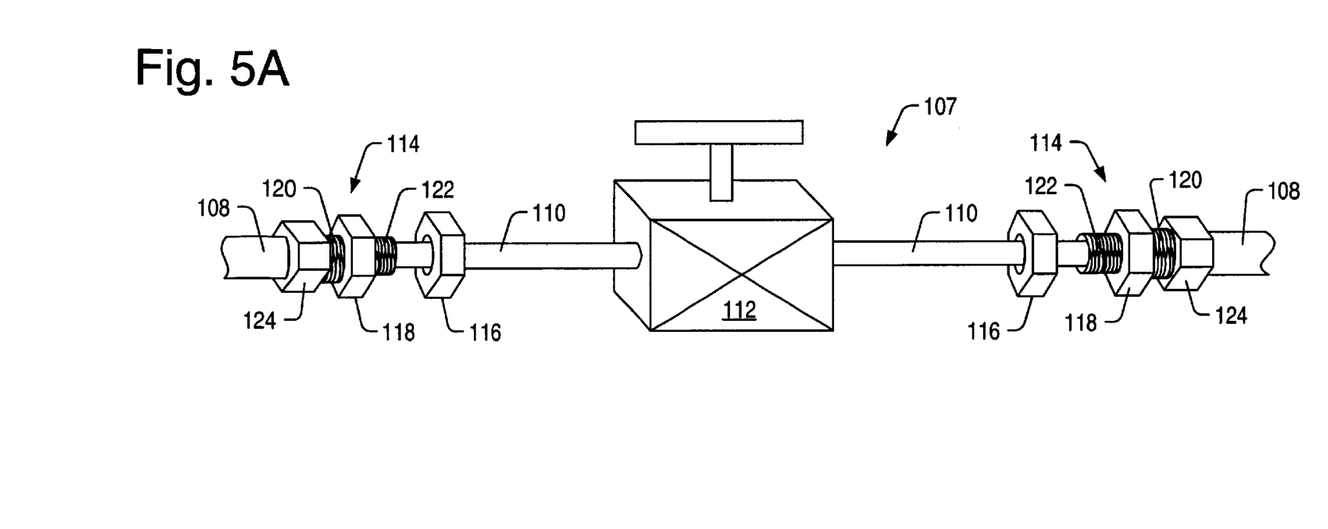
FIGS. 5a–5d are perspective views illustrating a method for providing containment of devices installed along an inner conduit of a double-walled conduit.

A method for using the enclosure recited herein to provide containment around a device installed along a conduit is illustrated in FIGS. 5a–5d. The device is first installed in the conduit to form conduit assembly 107, as shown in FIG. 5a. In the embodiment of FIG. 5, outer conduit 108 surrounds inner conduit 110. Outer conduit 108 is cut to expose the portion of inner conduit 110 which is to be contained by the enclosure. Inner conduit 110 is cut for installation of valve 112 and bulkhead connectors 114, used to connect conduit assembly 107 to the enclosure. Locknuts 116 mate with bulkhead connectors 114 when the enclosure is assembled. Bulkhead connectors 114 typically include a nut portion 118 permanently connected to threaded portions 120 and 122 on either side. Connector 114 has a hollow bore which inner conduit 110 extends through. Outer conduit 108 may be connected to connector 114 using a compression fitting including nut 124 which tightens onto threaded portion 120. Outer conduit 108 may extend within the bore of threaded portion 120, but is typically blocked by the diameter of the bore through nut portion 118 from extending all the way through connector 114. Other types of connectors may also be suitable for connection of the conduit assembly to the enclosure. Although one valve is installed along inner conduit 110 in the embodiment of FIG. 5, different devices and/or multiple devices may be installed, depending on application requirements. Although not shown, various fittings, including pipe fittings and compression fittings, may be used to install devices such as valve 112 along inner conduit 110.

Figure 5B:
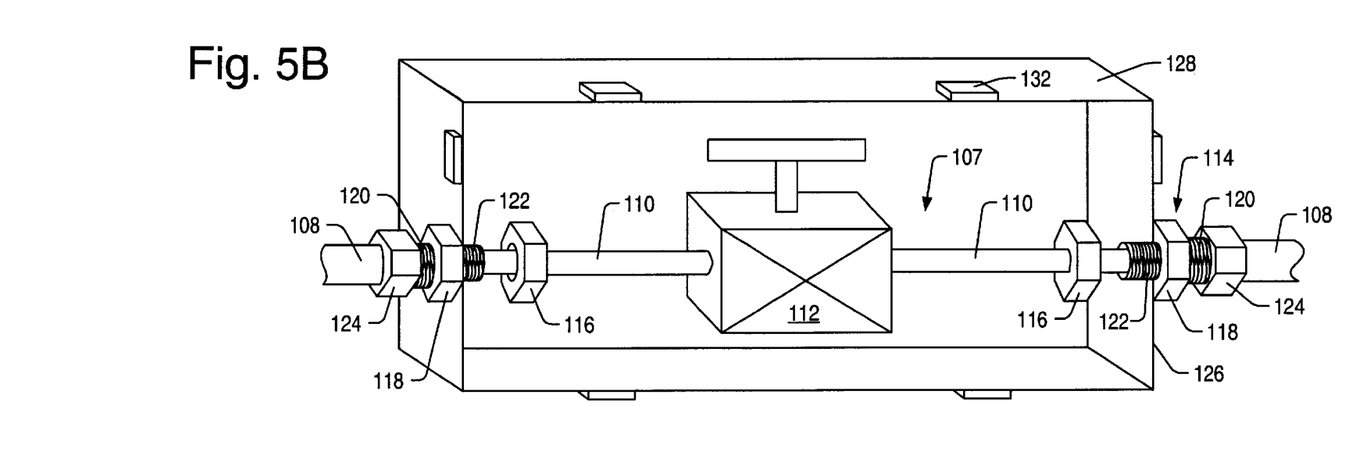
Figure 5C:
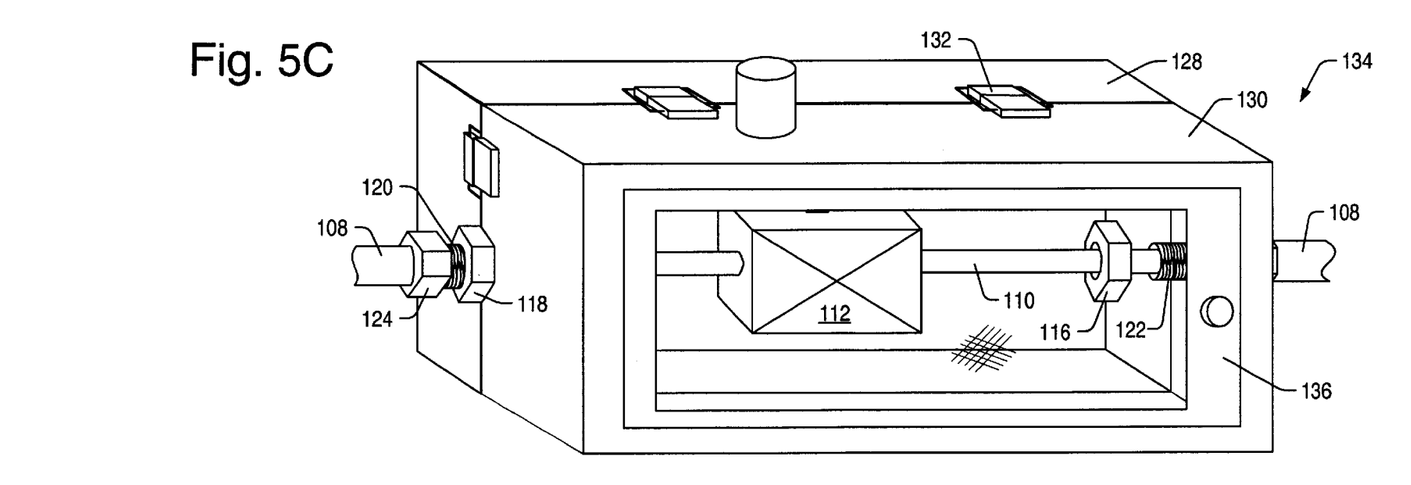
Figure 5D:
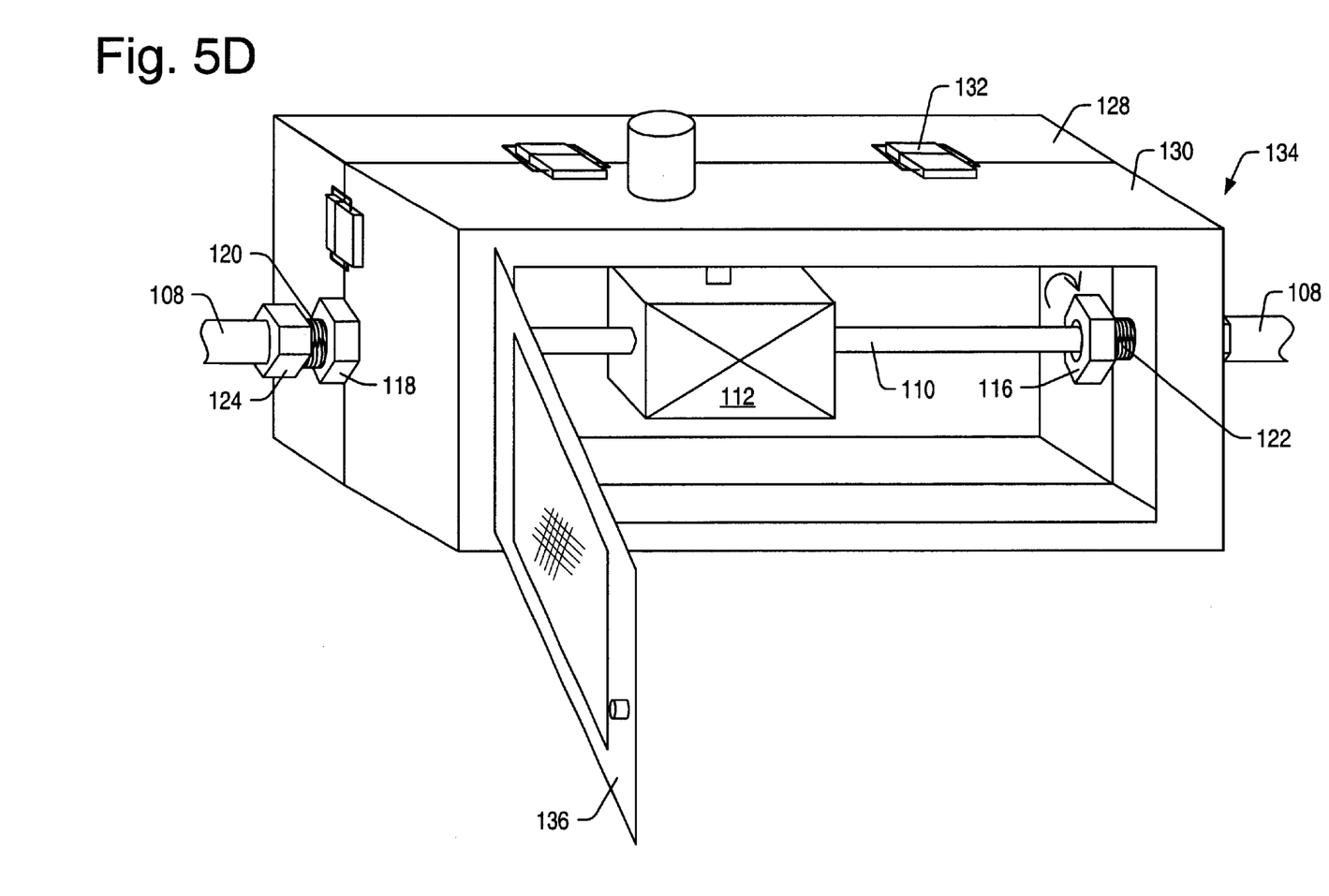

Conduit assembly 107 of FIG. 5a is then placed within notches formed in mating edge 126 of first enclosure portion 128, as shown in FIG. 5b. In the embodiment of FIG. 5, threaded portions 122 of connectors 114 are placed within the notches, with nut portions 118 just outside of the enclosure, and locknuts 116 within the enclosure. The notches are therefore preferably sized such that the resulting conduit openings have a diameter slightly larger than that of portions 122. If other types of connector are used, the orientation of the connector parts with respect to the enclosure may be different. First enclosure portion 128 of FIG. 5b could represent, for example, portion 42 of FIG. 2, portion 70 of FIG. 3, or portions 90 or 92 of FIG. 4. Second enclosure portion 130 is then connected to first portion 128, using fasteners such as latches 132, to form enclosure 134 as shown in FIG. 5c. Notches in portion 130 align with those in portion 128 so that openings are formed around the conduit assembly. Portion 130 of FIG. 5c could represent, for example, portion 44 of FIG. 2, portion 72 of FIG. 3, or portions 92 or 94 of FIG. 4. After formation of enclosure 134, locknuts 116 are tightened over threaded portions 122 of connectors 114, so that the conduit assembly is securely attached to enclosure 134. This tightening is done by opening door 136, as shown in FIG. 5d.

Figure 6A:
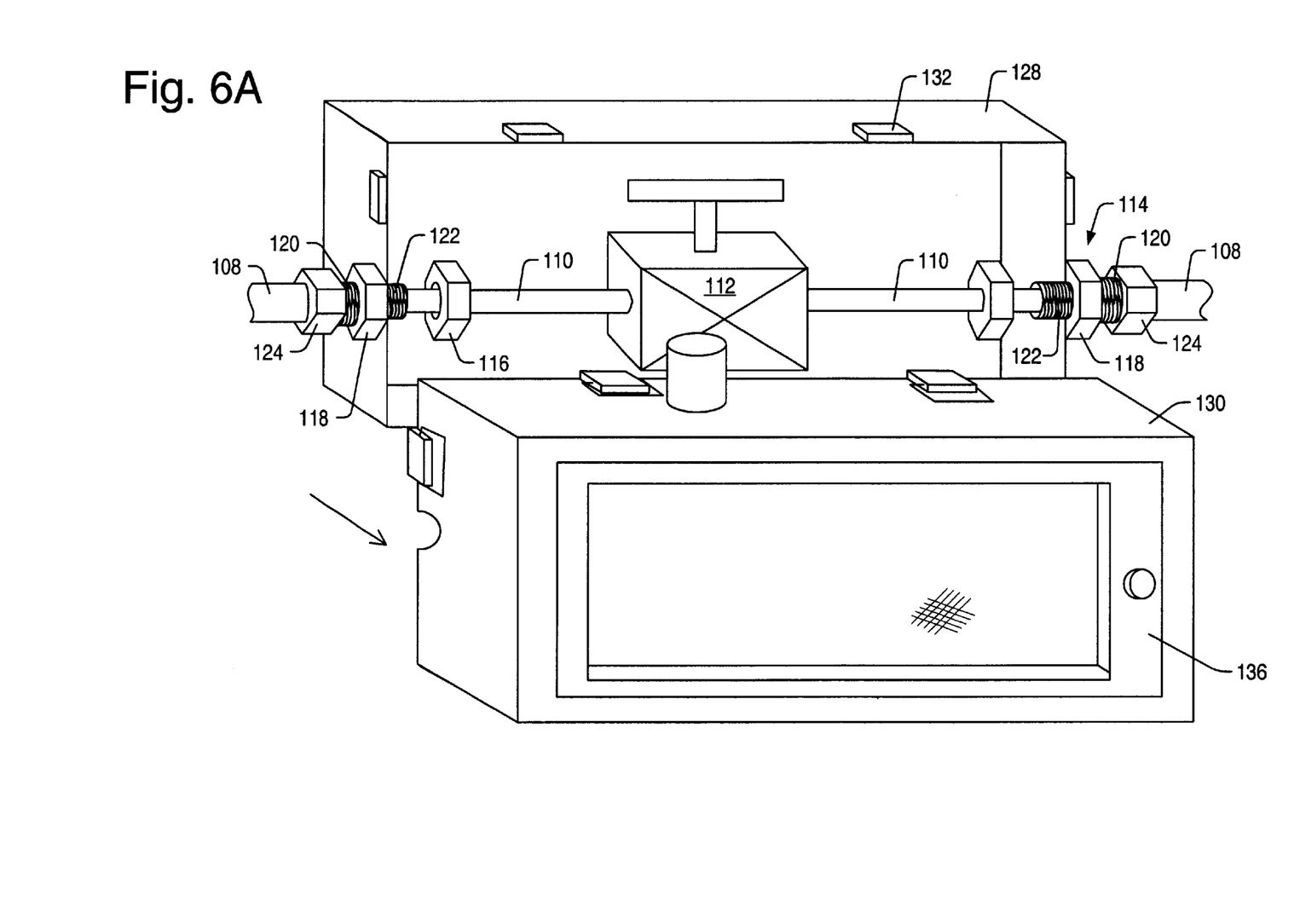
FIGS. 6a–6d are perspective views illustrating a method for modifying a device installed along a conduit within a containment enclosure as shown in FIGS. 5a–5d.
Figure 6B:
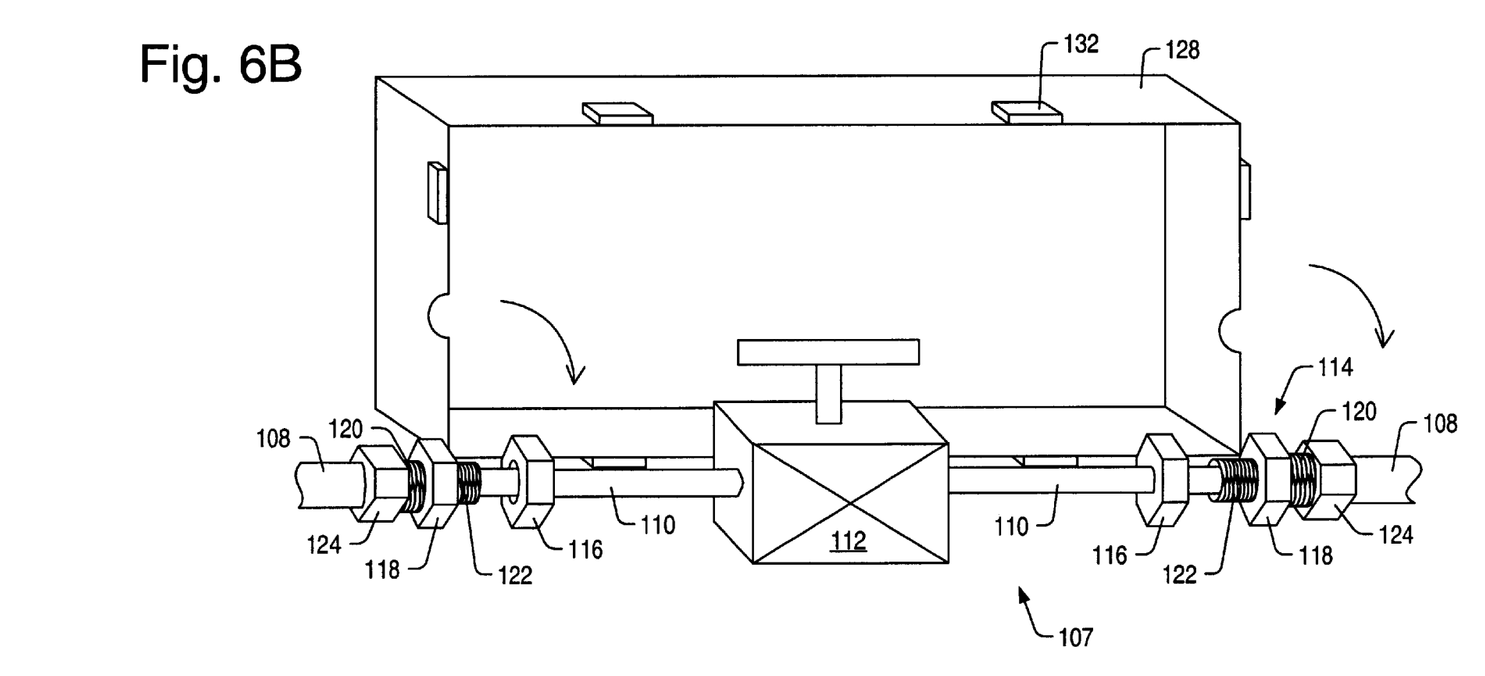
Figure 6C:
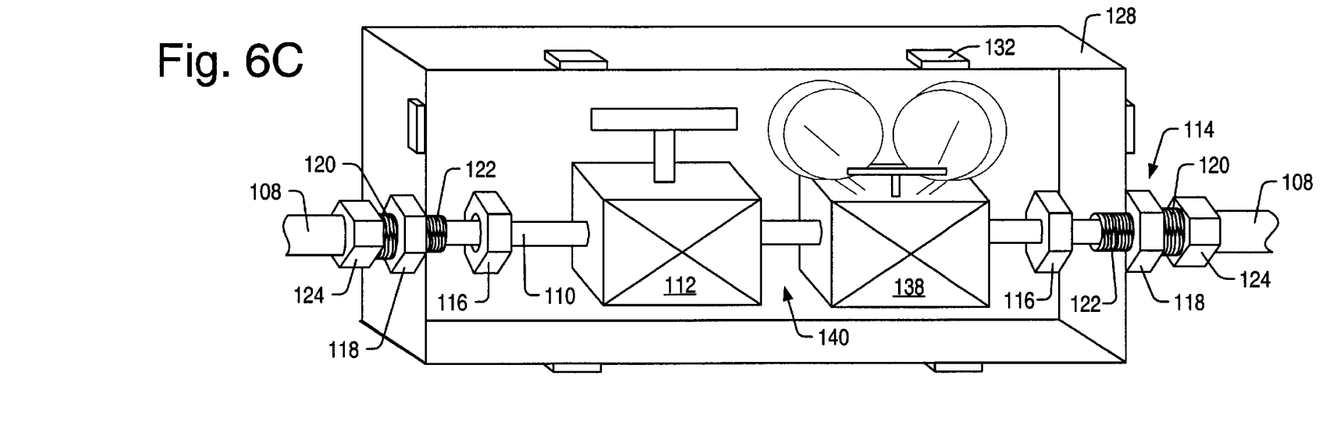
Figure 6D:
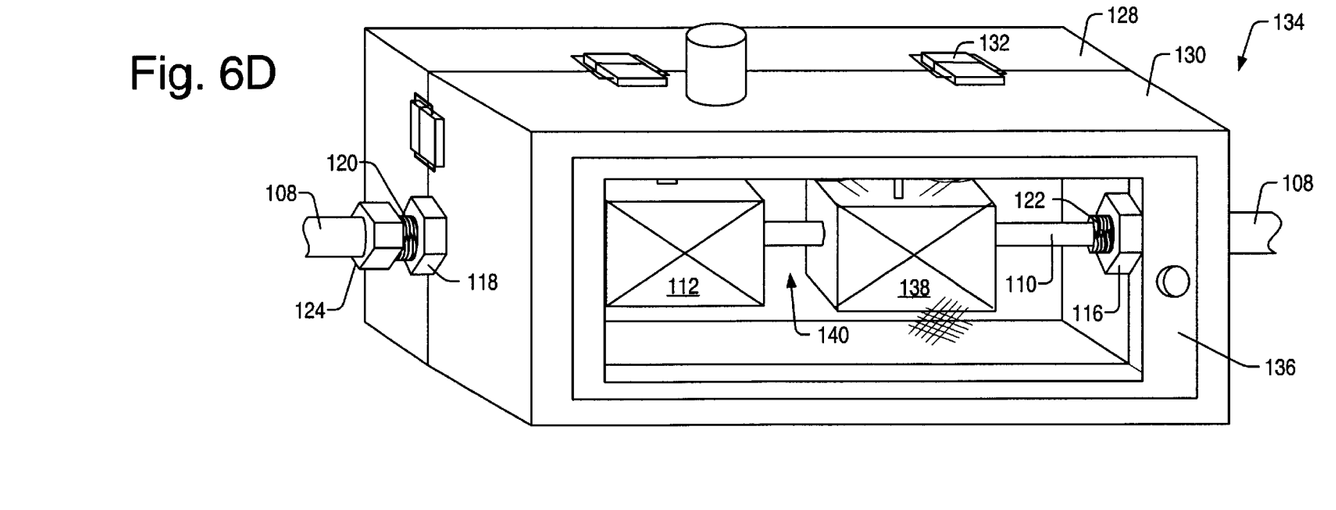

A method for modifying a device installed within a containment enclosure as described above is shown in FIGS. 6a–6d. "Modifying a device" could refer to performing routine maintenance, such as changing a filter cartridge, repairing a device, or reconfiguring the conduit assembly to include more or different devices. In some installations, sufficient working room for modification may be obtained by opening door 136 and reaching into enclosure 134. In situations for which this is not workable, however, portion 130 of enclosure 134 is removed, as shown in FIG. 6a. Before removal of portion 130, locknuts 116 are loosened by reaching in through opened door 136, in a reversal of the tightening illustrated in FIG. 5d. In some installations, removal of portion 130 may provide sufficient working room for the modification to be performed. If more room is needed, conduit assembly 107 may be removed from portion 128, as shown in FIG. 6b. After modification of the conduit assembly is performed, the assembly is replaced within the notches formed in portion 128, as shown in FIG. 6c. In the embodiment of FIG. 6, the modification includes installation of a regulator 138 to form new conduit assembly 140. Portion 130 is then replaced and locknuts 116 tightened so that conduit assembly 140 is contained by enclosure 134, as shown in FIG. 6d.

It will be appreciated to those skilled in the art having the benefit of this disclosure that this invention is believed to provide an enclosure formed from two or more separable portions for containment of chemical distribution lines, and methods for installation and modification of devices along such chemical distribution lines. Further modifications and alternative embodiments of various aspects of the invention will be apparent to those skilled in the art in view of this description. For example, if a connector which can be tightened from the outside of the enclosure is used to connect conduit to the enclosure, a door in the enclosure may not be needed. It is intended that the following claims be interpreted to embrace all such modifications and changes and, accordingly, the specification and drawings are to be regarded in an illustrative rather than a restrictive sense.

What is claimed is:

1. An apparatus for containment of a fluid, comprising:
    a first enclosure portion having a first notch in a first mating edge;
    a second enclosure portion having a second notch in a second mating edge, wherein said first and second enclosure portions fit together along said first and second mating edge to form a containment enclosure, and wherein said first and second notches align to form an opening in the containment enclosure;
    wherein said second enclosure portion comprises a door; and
    an exhaust connection penetrating a wall of the containment enclosure, wherein said exhaust connection is adapted for coupling to an exhaust system, such that a fluid within the containment enclosure may be pulled through the exhaust connection into the exhaust system.

2. The apparatus as recited in claim 1, wherein the containment enclosure has the shape of a rectangular box.

3. The apparatus as recited in claim 1, wherein the first and second notches are semicircular in shape, such that the opening is circular.

4. The apparatus as recited in claim 1, further comprising a fastener connecting the first and second enclosure portions, wherein said fastener has a reversible action.

5. The apparatus as recited in claim 4, wherein said fastener is a latch.

6. The apparatus as recited in claim 1, wherein said first mating edge comprises:
    a first mating surface extending from an exterior surface of the first enclosure portion toward the interior of the first enclosure portion; and
    a ledge extending from the interior end of the first mating surface, such that the ledge underlies the second enclosure portion when the first and second enclosure portions are connected to form the containment enclosure.

7. The apparatus as recited in claim 1, wherein said first enclosure portion comprises:
    a bottom wall of the containment enclosure; and
    a lateral wall connected to and extending upward from the entirety of a peripheral edge of the bottom wall, such that liquid may be contained at the bottom of the first enclosure portion.

8. The apparatus as recited in claim 7, further comprising a drain connection penetrating the bottom wall of the containment enclosure, wherein said drain connection is adapted for coupling to a drainage system, such that liquids within said containment enclosure may flow to the drainage system through the drain connection.

9. The apparatus as recited in claim 1, wherein said door comprises a window.

10. The apparatus as recited in claim 9, wherein said window comprises a transparent, shatter-resistant, and chemical-resistant material.

11. The apparatus as recited in claim 10, wherein said window comprises reinforced glass.

12. The apparatus as recited in claim 1, wherein said door comprises a latch securing the door to a wall of the second enclosure portion.

13. The apparatus as recited in claim 1, wherein said door is connected to said second enclosure portion using a hinge.

14. The apparatus as recited in claim 1, wherein said first and second enclosure portions comprise a chemical-resistant material.

15. The apparatus as recited in claim 14, wherein said first and second enclosure portions comprise stainless steel.

16. The apparatus of claim 1, wherein the first enclosure portion further comprises a third notch in the first mating edge, the second enclosure portion further comprises a fourth notch in the second mating edge, and the third and fourth notches are aligned to form a second opening in the containment enclosure.

17. The apparatus of claim 16, wherein the opening and the second opening are formed within separate walls of the enclosure.

18. An apparatus for containment of a fluid, comprising:
    a first enclosure portion having a first notch in a first mating edge;
    a second enclosure portion having a second notch in a second mating edge and a third notch in a third mating edge, wherein said first and second enclosure portions fit together along said first and second mating edge to form a containment enclosure, and wherein said first and second notches align to form an opening in the containment enclosure,
    a third enclosure portion having a fourth notch in a fourth mating edge, wherein
        said second and third enclosure portions fit together along said third and fourth mating edges to form the containment enclosure, and wherein
        said third and fourth notches align to form an additional opening in the containment enclosure; and
    an exhaust connection penetrating a wall of the containment enclosure, wherein said exhaust connection is adapted for coupling to an exhaust system, such that a fluid within the containment enclosure may be pulled through the exhaust connection into the exhaust system.

19. The apparatus as recited in claim 18, further comprising fasteners connecting the second enclosure portion to the first and third enclosure portions, wherein said fasteners have a reversible action.

20. The apparatus as recited in claim 18, wherein said third enclosure portion comprises a door.

21. The apparatus as recited in claim 20, wherein said door comprises a window.

22. The apparatus as recited in claim 18, wherein the first and second notches are semicircular in shape.

23. The apparatus as recited in claim 18, wherein said first enclosure portion comprises:
    a bottom wall of the containment enclosure; and
    a lateral wall connected to and extending upward from the entirety of a peripheral edge of the bottom wall, such that liquid may be contained at the bottom of the first enclosure portion.

24. The apparatus as recited in claim 23, further comprising a drain connection penetrating the bottom wall of the containment enclosure, wherein said drain connection is adapted for coupling to a drainage system, such that liquids within said containment enclosure may flow to the drainage system through the drain connection.

* * * * *